United States Patent
Strong et al.

(10) Patent No.: US 11,468,171 B2
(45) Date of Patent: **\*Oct. 11, 2022**

(54) SECURE BOOT VIA SYSTEM AND POWER MANAGEMENT MICROCONTROLLER

(71) Applicant: Micron Technology, Inc., Boise, ID (US)

(72) Inventors: Robert W. Strong, Folsom, CA (US); Dustin J. Carter, Placerville, CA (US); Neil Levine, Davis, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/104,876

(22) Filed: Nov. 25, 2020

(65) Prior Publication Data
US 2021/0081537 A1 Mar. 18, 2021

Related U.S. Application Data

(63) Continuation of application No. 16/123,084, filed on Sep. 6, 2018, now Pat. No. 10,956,576.

(51) Int. Cl.
*G06F 21/57* (2013.01)
*H04L 9/32* (2006.01)
(Continued)

(52) U.S. Cl.
CPC .............. *G06F 21/575* (2013.01); *G06F 1/26* (2013.01); *G06F 8/60* (2013.01); *G06F 9/30003* (2013.01); *G06F 9/441* (2013.01); *H04L 9/3249* (2013.01)

(58) Field of Classification Search
CPC ..... G06F 1/32; G06F 1/12; G06F 1/28; G06F 9/44; G06F 21/57
See application file for complete search history.

(56) References Cited

U.S. PATENT DOCUMENTS 6,546,489 B1 * 4/2003 Frank, Jr. .............. G06F 21/575
713/187
7,235,999 B2 6/2007 Goetting et al.
(Continued)

FOREIGN PATENT DOCUMENTS

CN 107025406 A 8/2017
CN 112789574 5/2021
(Continued)

OTHER PUBLICATIONS

"International Application Serial No. PCT/US2019/049782, International Search Report dated Jan. 10, 2020", 3 pgs.
(Continued)

*Primary Examiner* — Keshab R Pandey
(74) *Attorney, Agent, or Firm* — Schwegman Lundberg & Woessner, P.A.

(57) ABSTRACT

A variety of applications can include apparatus and/or methods of controlling a secure boot mode for a memory system. In an embodiment, a system includes a memory component and a processing device, where the processing device is configured to control a boot process for the system to operate the memory component and perform a cryptographic verification with a host to conduct an authentication of the host. The processing device can interact with the host, in response to the authentication, to receive a setting to control the boot process in a secure boot mode. The processing can interact with another processing device of the system to store the setting and to receive a secure boot signal from the other processing device, where the secure boot signal is a signal to assert or de-assert the secure boot mode depending on a value of the setting. Additional apparatus, systems, and methods are disclosed.

20 Claims, 6 Drawing Sheets

(51) Int. Cl.
    *G06F 9/4401*     (2018.01)
    *G06F 8/60*     (2018.01)
    *G06F 9/30*     (2018.01)
    *G06F 1/26*     (2006.01)

(56) References Cited

U.S. PATENT DOCUMENTS

| | | | |
|---|---|---|---|
| 9,798,625 B2 | 10/2017 | Teshome et al. | |
| 10,956,576 B2 | 3/2021 | Strong et al. | |
| 2006/0123339 A1* | 6/2006 | DiMichele | G07F 17/3227 715/700 |
| 2012/0246395 A1* | 9/2012 | Cho | G06F 12/0638 711/103 |
| 2013/0145139 A1 | 6/2013 | Adam et al. | |
| 2013/0305028 A1* | 11/2013 | Mo | G06F 21/572 713/2 |
| 2015/0121054 A1 | 4/2015 | Wu | |
| 2016/0266912 A1* | 9/2016 | Ye | G06F 9/4401 |
| 2016/0291985 A1* | 10/2016 | Jenkins | G06F 3/0679 |
| 2018/0124211 A1 | 5/2018 | Athalye et al. | |
| 2018/0157841 A1 | 6/2018 | Shin et al. | |
| 2020/0082089 A1 | 3/2020 | Strong et al. | |

FOREIGN PATENT DOCUMENTS

| | | |
|---|---|---|
| EP | 1975836 A2 | 10/2008 |
| EP | 2141625 A2 | 1/2010 |
| KR | 20180092596 A | 8/2018 |
| WO | WO-2020051355 A1 | 3/2020 |

OTHER PUBLICATIONS

"International Application Serial No. PCT/US2019/049782, Written Opinion dated Jan. 10, 2020", 4 pgs.

"International Application Serial No. PCT US2019 049782, International Preliminary Report on Patentability dated Mar. 18, 2021", 6 pgs.

"Chinese Application Serial No. 201980064985.5, Office Action dated Nov. 3, 2021", w/o English translation, 5 pgs.

"European Application Serial No. 19856743.0, Extended European Search Report dated Mar. 31, 2022", 8 pgs.

\* cited by examiner

SECURE BOOT VIA SYSTEM AND POWER MANAGEMENT MICROCONTROLLER

PRIORITY APPLICATION

This application is a continuation of U.S. application Ser. No. 16/123,084, filed Sep. 6, 2018, which is incorporated herein by reference in their entirety.

TECHNICAL FIELD

Embodiments of the disclosure relate generally to memory sub-systems, and more specifically, to a secure boot via a system and power management microcontroller.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to managing a memory sub-system including a secure boot for the memory sub-system. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

When a memory sub-system, such as a SSD, is powered, a boot process is initiated in the SSD to enable loading of an operating system within the memory sub-system. In a boot process for a memory sub-system, a memory controller can read a set of instructions, which are typically code resident in a read-only memory (ROM). The resident code is small firmware (FW) program referred to as a primary boot loader (PBL), which can run a self-test and search for a boot device, which can typically be a non-volatile memory component, that stores a secondary boot loader (SBL). The SBL can read and load programs from a storage media into a main memory and can pass control to the programs for operation of the memory sub-system. If the PBL in the ROM fails to load the SBL, the PBL through execution by the memory controller can communicate with a host through an interface, such as a peripheral component interconnect express (PCIe) interface. PCIe is a high-speed bus standard. In the communication, the PBL can expose a minimal PCIe header to the host.

Through the exposed PCIe header, the host can issue commands to the memory controller to download firmware to the memory sub-system. For example, during manufacturing of the memory sub-system, the host can download manufacturing test FW. An issue with this mechanism is that the PBL does not perform a verification, such as a digital signature verification, on the FW downloaded by the host. An example of a digital signature verification is a Rivest-Shamir-Adleman (RSA) signature verification. This mechanism, without such a verification, has a vulnerability that an attacker, acting as a host, could use to download malware onto the memory sub-system.

This situation can be avoided by placing the memory sub-system in a secure boot mode (SBM) during the boot process. In some embodiments, the PBL is not resource constrained and can support digital signature verification implemented in FW and/or hardware (HW), while in other embodiments, such as but not limited to situations in which resources are lacking, a SBM scheme can be implemented. In a SBM, the PBL is prevented from downloading FW from the host. The functionality of downloading FW from the host, or other entity exterior to the memory sub-system, can be disabled by the memory controller. The memory controller in some conventional designs can perform this disabling via electronic fuses (eFuses). EFuse technology allows for the dynamic real-time reprogramming of an integrated circuit, which can also be referred to as an IC, a chip, or a microchip. Logic in a chip is generally fixed into the chip and is not changed after the chip is manufactured. By utilizing a set of eFuses, a chip manufacturer can allow for changes to circuits by blowing one or more eFuses to reroute chip logic. The eFuses are typically only programmable by the memory controller during the manufacturing phase of the memory controller. Having a memory controller manufacturer program eFuses may not be desirable, since once programmed, the eFuse programming cannot be reverted to the previous configuration, which does not allow a manufacturer of the memory sub-system, separate from the memory controller manufacturer, to directly program the eFuses.

When the SBM eFuse is programmed, the PBL does not allow a host to download FW to the memory sub-system.

This situation can cause challenges during memory subsystem manufacturing and failure analysis (FA). During manufacturing in such a situation, negative-or (NOR) memory components or negative- and (NAND) memory components are pre-programmed, which may not be desirable. During FA, when the main FW for the booting process is non-functional, there would be no mechanism for downloading debug FW; basically, resulting in a useless, bricked memory sub-system. In some cases, a side effect of programming SBM can include the memory controller automatically disabling both JTAG and SMBus. JTAG (Joint Test Action Group) is an interface used for debugging and programming devices like controllers, complex programmable logic devices (CPLDs), and field-programmable gate arrays (FPGAs). SMBus (system management bus) is a single-ended simple two-wire bus for the purpose of lightweight communication. The SMBus can be arranged as a slave bus relative to other bus structures in the memory sub-system. With both the memory controller's JTAG interface and SMBus disabled, external computer assisted reporting (CAR) is disabled. Disallowing access to the JTAG and SMBus interfaces prevents unauthorized actors from injecting malware into the storage controller's non-volatile and/or volatile memories and prevents unauthorized access to critical security parameters (CSP) used to secure the storage controller and provide protection of data at rest.

Aspects of the present disclosure address the above and other deficiencies associated with a secure boot of a memory sub-system by generating a secure boot signal to a processor of the memory sub-system, where the processor controls the boot process of the memory sub-system. The secure boot signal is sent to the processor to assert or de-assert a secure boot mode. The secure boot signal is sent to the processor by another processor of the memory sub-system. The secure boot signal is based on a setting received from a host following a cryptographic verification with the host by the processor, which controls the boot process, to authenticate the host. In various example embodiments, a system comprises a memory component and a processing device, coupled to the memory component, configured to control a boot process for the system to operate the memory component. The processing device can perform a cryptographic verification with a host to conduct an authentication of the host, and interact with the host, in response to the authentication, to receive a setting to control the boot process in a secure boot mode. The processing device can interact with another processing device of the system to store the setting and receive a secure boot signal from the other processing device, where the secure boot signal is a signal to assert or d-assert the secure boot mode depending on a value of the setting.

With the secure boot mode controlled by a secure boot signal between the two processing devices, there is flexibility in responses by these two processing devices to a detection of a failure in the boot process, such as a determination that the PBL fails to load the SBL. Firmware in each of the two processing devices can provide instructions for communication between the two processing devices such that the secure boot signal can be changed to de-assert the secure boot mode. The processing device that controls the boot process, in response to receiving the secure boot signal to de-assert the secure boot mode, can interact with the host to allow download of firmware to execute instructions as a secondary boot loader. This approach to a secure boot can avoid issues with programming SBM fuses in the manufacturing of the processing device that controls the boot process. In addition, this approach can also avoid pre-programming NOR memory components and allow for download of FA firmware and manufacturing test FW as well. FA firmware is a special firmware image that can be directly loaded and executed in random access memory (RAM) without being programmed first in a storage media of the memory sub-system. The storage media may be a NAND memory component.

Figure 1:
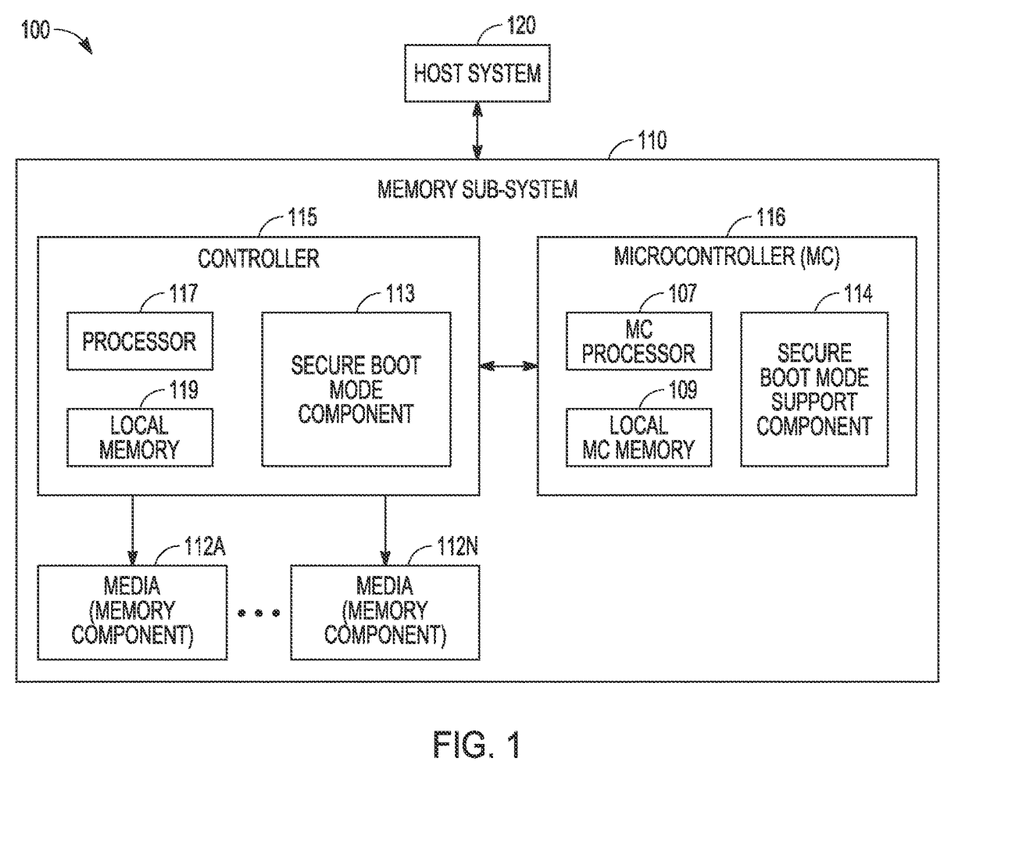
FIG. 1 illustrates an example computing environment that includes a memory sub-system, in accordance with various embodiments.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system 110 is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a PCIe interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a NAND type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, RAM, ROM, dynamic random access memory (DRAM), synchronous dynamic random access memory (SDRAM), phase change memory (PCM), magneto random access memory (MRAM), NOR flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 (herein referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a secure boot mode component 113 that can perform a cryptographic verification with the host system 120 to conduct an authentication of the host system 120 and interact with host system 120, in response to the authentication, to receive a setting to control a boot process of the memory sub-system 110 in a secure boot mode. In some embodiments, the controller 115 includes at least a portion of the secure boot mode component 113. For example, the controller 115 can include a processor 117 (processing device) configured to execute instructions stored in local memory 119 for performing the operations described herein. In some embodiments, the secure boot mode component 113 is part of the memory sub-system 110, an application, or an operating system.

The secure boot mode component 113 can include firmware executed by the processor 117 to interact with a microcontroller (MC) 116, which is another processing device of the memory sub-system 110 to store the setting received from the host system 120 in a secure mechanism. The firmware of the secure boot mode component 113 can execute instructions with respect to the boot process in response to the controller 115 receiving a secure boot signal from the MC 116. The secure boot signal is a signal to assert or de-assert the secure boot mode depending on a value of the setting.

The MC 116 can include a MC processor 107 configured to execute instructions stored in a local MC memory 109. In the illustrated example, the local MC memory 109 of the controller 116 includes an embedded memory configured to store instructions for performing various processes, operations, logic flows, and routines that supports operation of the memory sub-system 110 in a boot process of memory sub-system 110. In some embodiments, the local MC memory 109 can include memory registers storing memory pointers, fetched data, etc. The local MC memory 109 can also include read-only memory (ROM) for storing micro-code and parameters related to a setting for a secure boot mode.

The MC 116 can include a secure boot mode support component 114 that supports the control of the secure boot process by the controller 115. The MC 116 receives a setting for the secure boot mode in response to the controller 115 performing a successful cryptographic operation with the host system 120 to acquire the setting from the host system 120. The secure boot mode support component 114 can include firmware having instructions executed by MC processor 107 to generate the secure boot signal to the controller 115 to assert or de-assert the secure boot mode based on a value of the setting. The MC 116 can be realized as a system and power management microcontroller that controls power to the controller 115. Alternatively, the controller 115 and the MC 116 can be an integrated device with one or more ROMs to facilitate a secure boot mode status with an internal secure boot mode signal. The integrated device engages with interactions with the host system 120, which can be conducted using one or more cryptographic secure mechanisms from a memory sub-system 110 power on through to successful operation of the SBL, which can include operational firmware or user operations executing in the memory sub-system 110. Further details with regards to the operations of the secure boot mode component 113 are described below.

Figure 2:
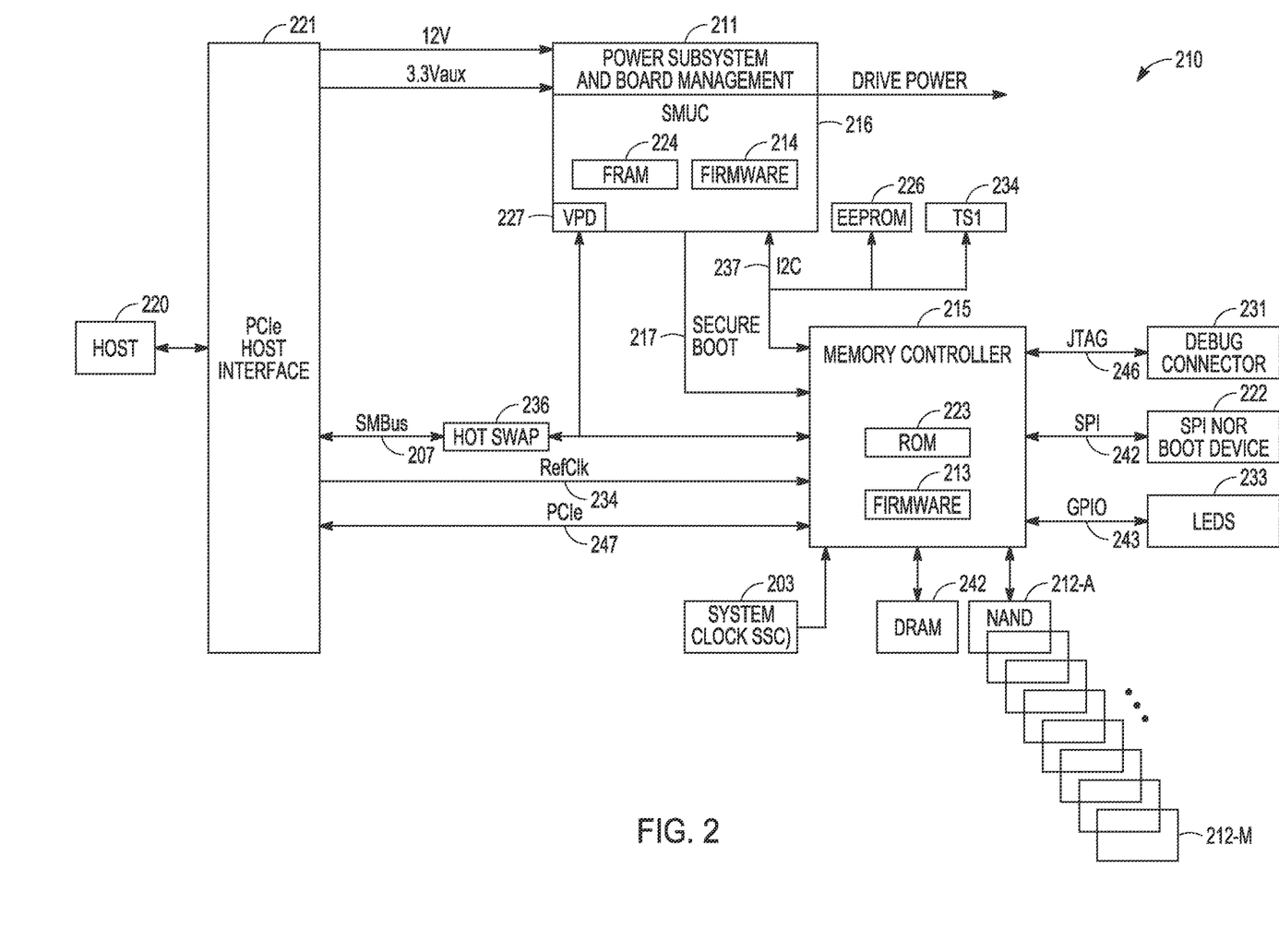
FIG. 2 is a block diagram of an example memory sub-system having a memory controller and a microcontroller arranged to interact with a host, in accordance with various embodiments.

FIG. 2 is a block diagram of an embodiment of an example memory sub-system 210 having a memory controller 215 and a microcontroller 216 arranged to interact with a host 220, which interaction can include using a cryptographic mechanism associated with controlling a secure boot mode for memory sub-system 210. The memory controller 215 may correspond to the controller 115 in FIG. 1, and the microcontroller 216 may correspond to the microcontroller 116. The memory sub-system 210 may correspond to the memory sub-system 110 of FIG. 1 and memory components 212-A to 212-M, may correspond to memory components 112A-112-N.

The memory sub-system 210 can be configured as a memory sub-system. The host 220 can communicate with the memory sub-system 210 through an interface 221, such as but not limited to a PCIe host interface, where a PCIe line 247 couples the PCIe host interface 221 to the memory controller 215. A reference clock (Ref CLk) 234 can also be provided to the memory controller 215 from the PCIe host interface 221. The host 220 also can communicate with memory sub-system 210 through the PCIe host interface 221 via a SMBus 207 coupling the PCIe host interface 221 to memory controller 215. The SMBus 207 can also couple the PCIe host interface 221, and hence the host 220, to a vital product data (VPD) unit 227, which provides data specific to memory sub-system 210 and associated users and consists of many different fields. The host system 220 can query this data. A hot swap unit 236 may be inserted in the path of the SMBus 207 between the PCIe host interface 221 and the memory controller 215. The hot swap is the ability to insert and remove a memory sub-system in a live system and to manage the manner in which power is safely applied and removed. It can also ensure the connection and the disconnection of the host SMBus is done in a benign manner.

The memory sub-system 210 can include media, such as the memory components 212-A to 212-M, coupled to the memory controller 215. The memory controller 215 can communicate with the memory components 212-A to 212-M to perform operations such as reading data, writing data, or erasing data at the memory components 212-A to 212-M and other such operations. The memory controller 215 can include hardware such as one or more integrated circuits and/or discrete components, a buffer memory, or a combination thereof. The memory controller 215 can be a microcontroller, special purpose logic circuitry (e.g., a field programmable gate array (FPGA), an application specific integrated circuit (ASIC), etc.), or other suitable processor. The memory controller 215 can include a processor configured to execute instructions stored in a local memory similar to the memory controller 115 of FIG. 1. The memory controller 215 can be coupled to other memory components such DRAM 242.

The memory controller 215 can be coupled to a number of other components to perform functions of the memory sub-system 210. Such other components can include, but are not limited to, a system clock 203, a debug connector 231 having a JTAG connection 246 to the memory controller 215, a serial peripheral interface (SPI) NOR boot device 222 having a SPI connection 242 to the memory controller 215, and light emitting diodes (LEDs) 233 having a general purpose input/output (GPIO) connection 243 to the memory controller 215. The SPI NOR Boot Device 222 is a non-volatile memory that can stores a SBL for memory sub-system 210. The LEDs 233 can provide an indication of the memory sub-system 210 status through various blink codes. The memory controller 215 can be coupled to a temperature sensor (TS) 234, which provides measurements of the temperature of the memory controller 215, via an I$^2$C bus. An I$^2$C bus is a bus used for communication between one or more masters and a single or multiple slave devices.

Ina boot process for the memory sub-system 210, the memory controller 215 can read a PBL in a read-only memory (ROM) 223. Alternatively, the PBL may optionally reside in EEPROM 226 coupled to the I$^2$C bus, which is coupled to the memory controller 215. The memory controller 215 runs the ROM code that contains the PBL from ROM 223, or in an alternative configuration from EEPROM 226. The PBL of ROM 223 attempts to load the SBL from the SPI NOR Boot Device 222. The SBL may be CRC-16 protected. Once the SBL is loaded, control is transferred to the SBL, which locates and loads main FW from a NAND such as NAND 212-A-212-M and control is transferred to the main FW.

The boot process for the memory sub-system 210, the memory controller 215 and the microcontroller 216 can operate together to provide a secure boot mode. In some embodiments, a secure boot includes a process where FW is cryptographically verified from memory sub-system 210 power on until the main FW is executing. Supporting secure boot assumes that the boot process starts with a root of trust. The root of trust is usually ROM code since it is immutable. In embodiments, as further discussed herein, rather than performing cryptographic verification of FW during device boot, a secure boot prevents the host 220 from downloading FW using the PBL, because the FW may not be digitally signed and would be untrusted, and disables debug interfaces that could be used to download untrusted FW onto the device. In addition, an embodiment of a secure boot could also support digital signature verification when the host 220 attempts to download FW via the PBL. The secure boot mode for memory sub-system 210 can be defined by disabling external access to the memory sub-system 210 during the ROM/PBL and SBL boot process. When a secure boot signal 217 is asserted by a power subsystem and board management unit 211, then invasive debug is not possible until the host 220 enables debug in a secure manner. One enabled, debug may be temporary and can be disabled when the memory controller 215 is powered cycled or when the host 220 securely disables the secure boot mode feature. Disabling external access ensures that invasive debug and configuration changes can be avoided.

In various embodiments, the memory controller 215 can allow a secure boot mode to be enabled through control based on a signal received by the memory controller 215. The signal is the secure boot signal 217, which can also be referred to as secure boot mode signal 217, that functions as a secure boot enable signal that can be used to assert or de-assert the secure boot mode. The secure boot signal 217 can be received by the memory controller 215 from the microcontroller 216. The microcontroller 216 can include an output pin to send the secure boot signal 217 to the memory controller 215 and the memory controller 215 can include an input pin to receive the secure boot signal 217. The secure boot mode signal 217 that is input to the memory controller 215 is a digital output signal from the microcontroller 216. A command code for the microcontroller 216 to assert (or de-assert) the secure boot mode signal 217 can be sent by the memory controller 215 to the microcontroller 216 over the I$^2$C bus.

The microcontroller 216 can be realized as a system and power management microcontroller that is par of the power subsystem and board management unit 211 that can receive power from the PCIe host interface 221, in the form of 12 volts and an auxiliary 3.3 volts, and can provide drive power to the other components of memory sub-system 210. The power subsystem and board management unit 211 can provide power to the memory controller 215 under the control of microcontroller 216. Other voltages may be supplied to the power subsystem and board management unit 211. With the microcontroller 216 controlling the sending of the secure boot signal 217 to the memory controller 215, since the microcontroller 216 controls the power of memory sub-system 210, once the memory sub-system comes out of a reset, a race condition may be avoided. For example, the memory sub-system 210 is held in reset until power is stable from an event such as power on.

The secure boot signal 217 is sent to the memory controller 215, to assert or de-assert the SBM, by the microprocessor 216 based on a SBM setting received from the host 220 following a cryptographic verification with the host 220 by the memory controller 215 to authenticate the host 220. The SBM setting can be stored in the microprocessor 216. To enable or disable the SBM setting in the microprocessor 216, firmware 213 of the memory controller 215 can include instructions to communicate with the microprocessor 216 via the internal I²C bus 237. The microcontroller 216 and the memory controller 215 can be coupled to the internal I²C bus 237, where the microcontroller 216 and the memory controller 215 can interact over the internal I²C bus 237 to disable or enable the secure boot mode by execution of instructions in microcontroller firmware 214 by the microcontroller 216 and execution of instructions in the memory controller firmware 213 by the memory controller 215.

The SBM setting can be stored within a ferroelectric RAM (FRAM) 224 that is a non-volatile memory (NVM). A FRAM can read and write like standard SRAM. A I²C command format and address can be used to enable/disable SBM. Reception of the SBM setting from the host 220 and generation of the secure boot signal 217 to the memory controller 215 based a value of the SBM setting can be controlled by the firmware 214 in microcontroller 216. Once code of the controller FW 213 has been executed with the execution of code of microcontroller FW 214, a power cycle for the memory sub-system 210 can be used for the microcontroller 216 to recognize a change in the SBM setting.

The host 220 can be responsible to provision the microcontroller with the correct (enabled) SBM setting after the memory sub-system 210 has transitioned into a deployed state. To support this provisioning, two commands, which may be vendor specific (VS) commands, can be implemented. The two commands can be a get_SBM_state command and a set_SBM_state command. The get_SBM_state command can be designated as a benign command, and the set_SBM_state command can be designated as a non-benign command.

Storage devices, such as memory sub-system 210, can use VS commands, which can also be referred to a vendor unique (VU) commands, to leverage capabilities of the storage device that extend beyond the standardized commands defined by interface specifications associated with the storage device. This means that storage devices can have more functionalities than the functionalities to meet technology standards for the operation of the storage device. VS commands can be used for debugging and failure analysis, manufacturing, device provisioning, etc. VS commands designated as non-benign may also referred to as restricted commands. Execution of a non-benign VS command by the storage device may change the state of the storage device, change the behavior of the storage device, or cause the storage device to reveal confidential information. Execution of a benign VS command by the storage device does not change the state of the storage device, change the behavior of the storage device, or cause the storage device to reveal confidential information.

The memory controller firmware 213 has stored instructions, executable by the memory controller 215, to cause the memory controller 215 to perform a cryptographic verification with the host 220 to conduct an authentication of the host 220 and to interact with the host 220, in response to the authentication, to receive the SBM setting to control the boot process in a secure boot mode. The memory controller firmware 213 can have instructions, when executed, to cause the memory controller 215 to interact with the microprocessor 216 to store the SBM setting and receive a secure boot signal 217 from the microprocessor 216, where the secure boot signal 217 is a signal to assert or de-assert the secure boot mode depending on a value of the setting. The cryptographic verification can include a RSA signature verification. RSA is a cryptosystem in which an encryption key public and is different from the decryption key, which is kept private. A public key is created and published based on two large prime numbers along with an auxiliary value, where the prime numbers are kept secret. Other cryptographic techniques can be used to implement a secure mechanism for a secure boot process. The memory controller 215, in response to receiving the secure boot signal 217 to de-assert the secure boot mode, can interact with the host 220 to allow download of firmware to execute instructions as a secondary boot loader.

The microcontroller FW 214 has instructions, executable by the microcontroller 216, to effectively interact with the host 220 through the memory controller 215, in response to transitioning to a secure boot enabled state, to provision the microcontroller 216 with an enabled secure boot mode setting via one or more specific commands. With the secure boot mode in a state at the transitioning, the one or more specific commands can include a command to get the state of the secure boot mode. The one or more specific commands can include a command to set the state of the secure boot mode, where the command to set the state of the secure boot mode is tied to a cryptographically secure authentication protocol. The cryptographically secure authentication protocol can include use of a digital signature.

Figure 3:
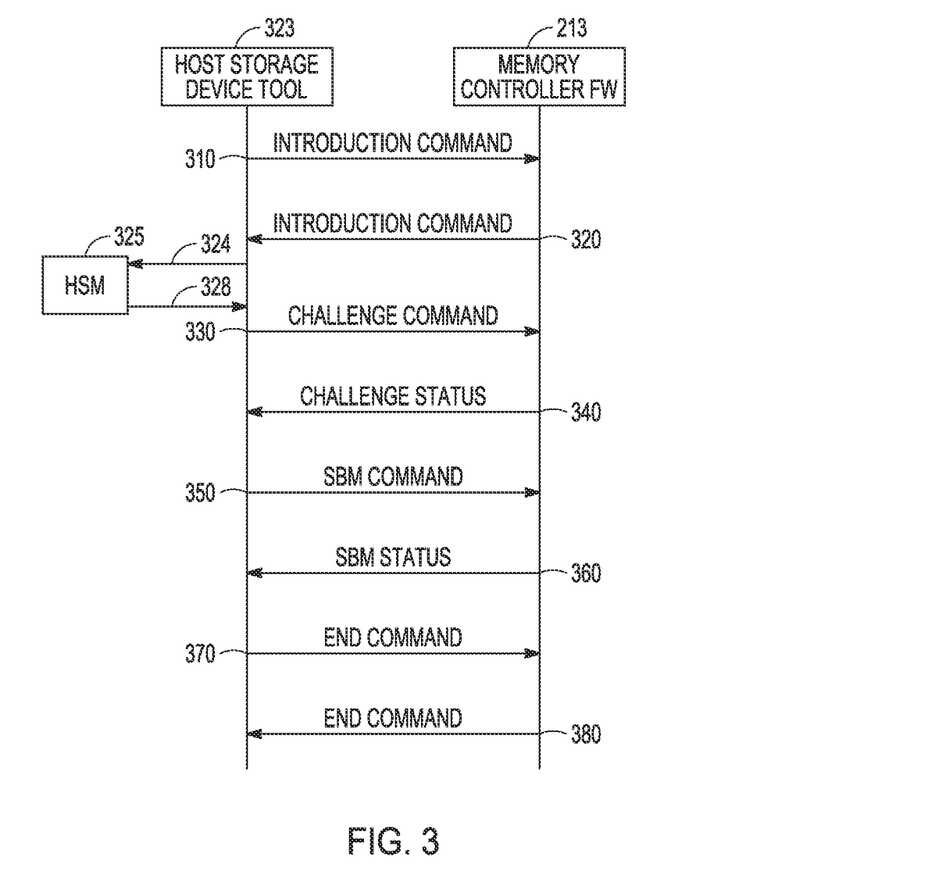
FIG. 3 is an example command flow between a host system and a memory sub-system that implements a secure mechanism to transfer a secure boot mode setting from the host system to the memory sub-system, in accordance with various embodiments.

FIG. 3 is an example command flow between a host system and a memory sub-system that implements a secure mechanism to transfer a SBM setting from the host system to the memory sub-system. For example, the host system can be host 220 and the memory sub-system can be the memory sub-system 210 of FIG. 2. The secure mechanism can be implemented between the host 220 and the memory controller FW 213. The host 220 has a host storage device tool 323, which is an application that executes on a host system containing the host 220 and the memory sub-system 210 that includes the memory controller 215 and microcontroller 216. At operation 310, an introduction command is sent by host storage device tool 323 to memory controller FW 213 to begin an authentication for host 220. At operation 320, a responding introduction command is sent by memory controller FW 213 to host storage device tool 323. The host storage device tool 323 of host 220 can communicate with a hardware security module (HSM) 325, which is a physical computing device that safeguards and manages digital keys for strong authentication, where the HSM is a secure, controlled resource. A challenge packet can be built by host storage device tool 323 using a nonce as a credential from memory controller FW 213, a public key, and management, instrumentation, and discovery (MID) data from multiple memory sub-systems that have homogenous and heterogeneous signing keys and can be sent to HSM 325 at operation 324. HSM 325 can sign the challenge packet using RSA and send to the host storage device tool 323 at operation 328.

At operation 330, a challenge command is sent to memory controller FW 213 from the host storage device tool 323, including a RSA signature form HSM 325. The challenge can be validated where the validation can include validation of the authentication public key, computation and comparison of the RSA signature using the authentication public key, and other criteria correlated to parameters in fields of the data structure sent in the challenged command. The memory sub-system 210 can implement a retires counter so that if a predetermined number of consecutive challenge requests fail, then a power cycle is used before another introduction/challenge exchange can be attempted. At operation 340, a challenge status can be sent from memory controller 213 to host storage device tool 323.

If the challenge command completed successfully, then all VS commands are unlocked. If the challenge command failed, then only benign VS commands are allowed. At operation 350, a SBM VS command is sent to memory controller FW 213 from the host storage device tool 323. At operation 360, a SBM status is sent from memory controller FW 213 to the host storage device tool 323. At operation 370, an end command is sent to memory controller FW 213 from the host storage device tool 323. At operation 380, an end command is send from memory controller FW 213 to the host storage device tool 323. Once the host 220 is un-authorized at the execution of the end commands, access to VS commands is limited to benign VS commands only. Host 220 attempts to access non-benign VS commands are aborted by the memory sub-system 210, unless a re-authentication is successfully completed. For a SBM change, if the challenge completes successfully, then the host 220 can send a VS command to the memory controller FW 213 instructing it to enable or disable the secure boot mode. Once the VS command is received, the memory controller FW 213 passes this request to set enablement or disablement to the microcontroller 216. The passing of the request can be executed using an API that does not require security. In an alternative approach, a similar methodology can be implemented in an interaction between the host storage device tool 323 and the microcontroller FW 214 to provide the SBM setting to microcontroller 216.

Authentication is the process by which a host establishes trust with a storage device, when the storage device is locked. When the host has not successfully authenticated with the storage device, then the host has limited VS access' the storage device only services non-benign VS command requests from the host. When the host has successfully authenticated with the storage device, then the host has unlimited VS access and the storage device services all benign and non-benign VS command requests from the host.

Figure 4:
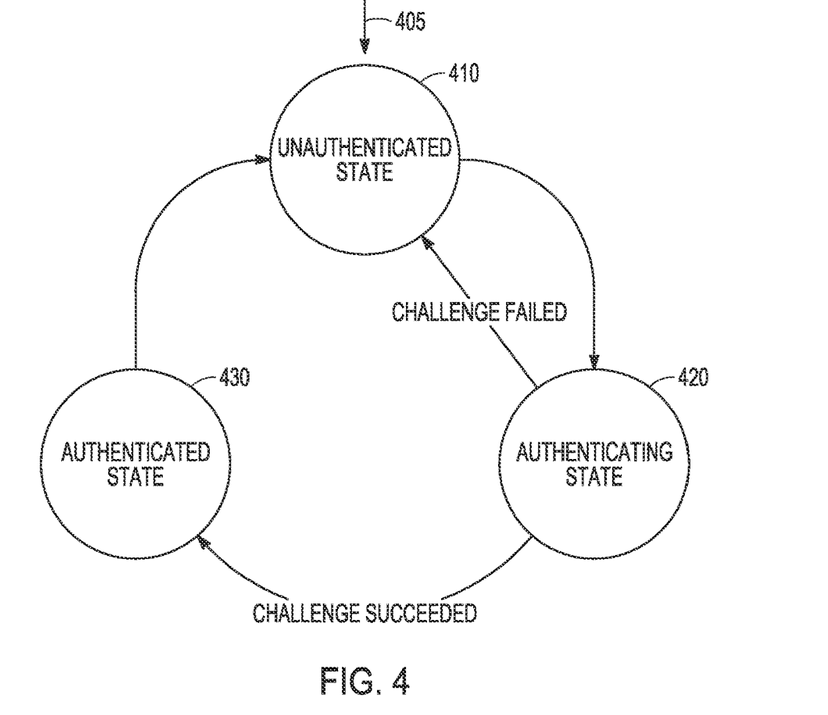
FIG. 4 illustrates authentication states supported by a memory sub-system such as the memory sub-system of FIG. 2 with respect to vendor specific commands, in accordance with various embodiments.

FIG. 4 illustrates authentication states supported by a memory sub-system such as memory sub-system 210 of FIG. 2 with respect to VS commands. The memory sub-system 210 can be an SSD having an ASIC memory controller 215. An introductory command 405 for execution of a VS command is provided to the memory controller 215 of the memory sub-system 210 from the host 220 with the memory sub-system 210 in an unauthenticated state 410. The memory sub-system 210 enters an authenticating state 420 in which the memory sub-system 210 interacts with the host 220 in an authenticating process for a challenge sent from the host 220 to the memory sub-system 210. If the challenge fails, the memory sub-system 210 reverts back to the unauthenticated state 410, where the memory sub-system 210 is not actively processing a challenge and does allow non-benign VS commands. If the challenge succeeded, the memory sub-system 210 is in an authenticated state 430 in which it can process benign and non-benign VS commands. The memory sub-system 210 can proceed back to the unauthenticated state 410 upon reception of a command from the host 220 ending the session or with the memory controller 215 executing a power cycle.

Figure 5:
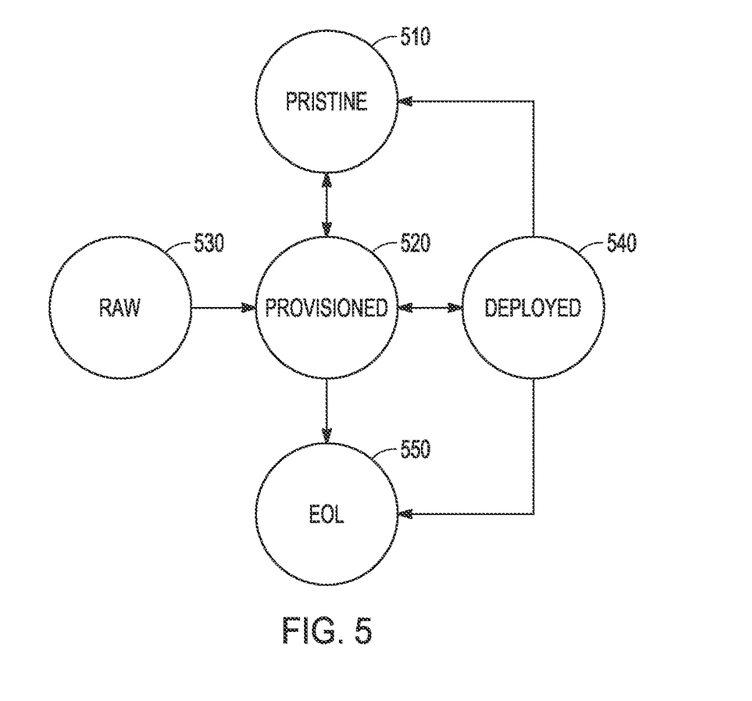
FIG. 5 illustrates life states of a memory sub-system such as the memory sub-system of FIG. 2, in accordance with various embodiments.

FIG. 5 illustrates life states of a memory sub-system such as memory sub-system 210 of FIG. 2. The memory sub-system 210 can be an SSD having an ASIC memory controller 215 including memory controller FW 213. At life state 510, memory sub-system 210 is in a pristine state, which is associated with its state in manufacture. At life state 520, memory sub-system 210 is in a provisioned state, which can include operational settings for the memory sub-system 210, including a SBM setting, can be provided from a source 530 effectively as raw parameters. In leaving manufacture, the memory sub-system 210 can be placed in a deployed state 540, which effectively informs the memory controller FW 213 to enforce all security features supported by the memory sub-system 210, including secure boot. In the deployed state 540, a host, such as host 220, performs an authentication process with the memory sub-system 210, as described above, before the memory controller FW 213 will process non-benign VS commands. Enabling and disabling secure boot mode for memory sub-system 210 is accomplished using a non-benign VS commands. Transition to different lifecycle states is performed using non-benign VS commands. If host 220 commands the memory controller 215 into provisioned state 520 or pristine state 510, then it is assumed that the memory sub-system 210 is in a safe, secure environment and as such the memory controller FW 213 may not require authentication. From provisioned state 520 or from deployed state 540, memory sub-system 210 can enter an end of life (EOL) state 550.

Because of security ramifications associated with not enabling SBM on deployed memory sub-systems, such as deployed SSDs, the host in manufacture can enable SBM on all memory sub-systems prior to customer ship. To simplify first time manufacturing of a memory sub-system, the SBM can be disabled by default, in which case, the microcontroller, such as microcontroller 216 of FIG. 2, does not assert the secure boot signal 217 to the memory controller 215 of memory sub-system 210 of FIG. 2. Support for a secure mechanism for enabling and disabling SBM is provided by microcontroller FW 214 and memory controller FW 213.

Figure 6:
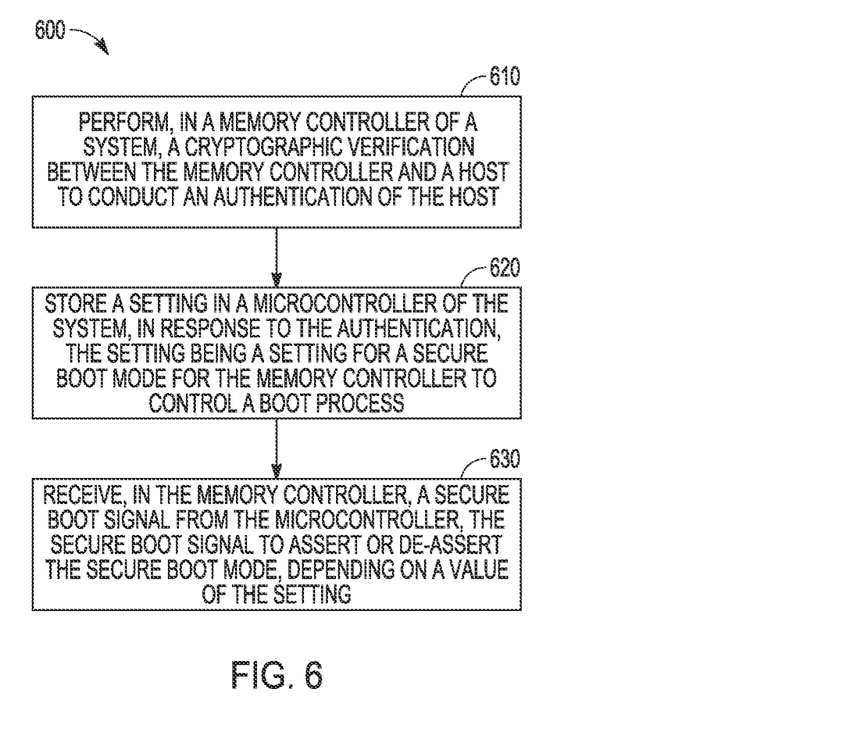
FIG. 6 is a flow diagram of features of an example method of providing a secure boot mode, in accordance with various embodiments.

FIG. 6 is a flow diagram of features of an embodiment of an example method 600 of providing a secure boot mode. At operation 610, a memory controller of a system performs a cryptographic verification between the memory controller and a host to conduct an authentication of the host. Performing cryptographic verification can include using a Rivest-Shamir-Adleman signature verification. At operation 620, the memory controller stores a setting in a microcontroller of the system, in response to the authentication, where the setting is a setting for a secure boot mode for the memory controller to control a boot process. At operation 630, the memory controller receives a secure boot signal from the microcontroller, where the secure boot signal is to assert or de-assert the secure boot mode, depending on a value of the setting. Method 600 or methods similar to method 600 can include de-asserting the secure boot mode, in response to a successful cryptographic verification with a host, to allow download of firmware to execute instructions as a secondary boot loader.

Variations of the method 600 or methods similar to the method 600 can include a number of different embodiments that can be combined depending on the application of such methods and/or the architecture of systems in which such methods are implemented. Such methods can include, in response to transitioning to a secure deployed state, provisioning the microcontroller with an enabled secure boot mode setting via one or more specific commands. With the secure boot mode in a state at the transitioning, one or more the specific commands include a command to get the state of the secure boot mode and a command to set the state of the secure boot mode, the command to set the state of the secure boot mode tied to a cryptographic authentication protocol. Such methods can include includes using a digital signature in the cryptographic authentication protocol.

Variations of the method 600 or methods similar to the method 600 can include directly loading a firmware image, via the host, into a random access memory coupled to the memory controller, in response to satisfaction of an authentication protocol performed between the memory controller and the host. Such a method can include executing instructions of the firmware image with the memory controller in a secure boot mode.

Firmware can comprise instructions, such as a microcode, which when executed by a memory controller, can cause performance of operations comprising: performing, in the memory controller of a system, a cryptographic verification between the memory controller and a host to conduct an authentication of the host; storing a setting in a microcontroller of the system, in response to the authentication, the setting being a setting for a secure boot mode for the memory controller to control a boot process; and receiving, in the memory controller, a secure boot signal from the microcontroller, the secure boot signal to assert or de-assert the secure boot mode, depending on a value of the setting. Performing cryptographic verification can include using a Rivest-Shamir-Adleman signature verification. Other cryptographic verifications can be used. Firmware can comprise instructions, such as a microcode, which when executed by a controller, can cause performance of operations comprising: operating the microcontroller to receive SBM settings from the host via the memory controller and generating the secure boot signal to the memory controller.

Instructions of the firmware, when executed by the memory controller, can cause performance of operations, which operations can include, in response to transitioning to a secure deployed state, provisioning the microcontroller with an enabled secure boot mode setting via one or more specific commands. With the secure boot mode in a state at the transitioning, the one or more specific commands can include a command to get the state of the secure boot mode and a command to set the state of the secure boot mode, the command to set the state of the secure boot mode is tied to a cryptographic authentication protocol. The cryptographic authentication protocol can include using a digital signature in the cryptographic authentication protocol.

Instructions of the firmware, when executed by the memory controller, can cause performance of operations, which operations can include de-asserting the secure boot mode, in response to a successful cryptographic verification with a host, to allow download of firmware to execute instructions as a secondary boot loader. Such instructions can also provide for operations that include directly loading a firmware image, via the host, into a random access memory coupled to the memory controller, in response to satisfaction of an authentication protocol performed between the memory controller and the host; and executing instructions of the firmware image with the memory controller in a secure boot mode.

Firmware can comprise instructions, such as a microcode, when executed by a controller, can cause performance of operations comprising operations associated with a secure boot of a memory sub-system coupled to a host as associated with the FIGS. 1-7. Instructions of firmware, which when executed by a controller, can cause performance of operations, which operations can include operations as taught herein.

Figure 7:
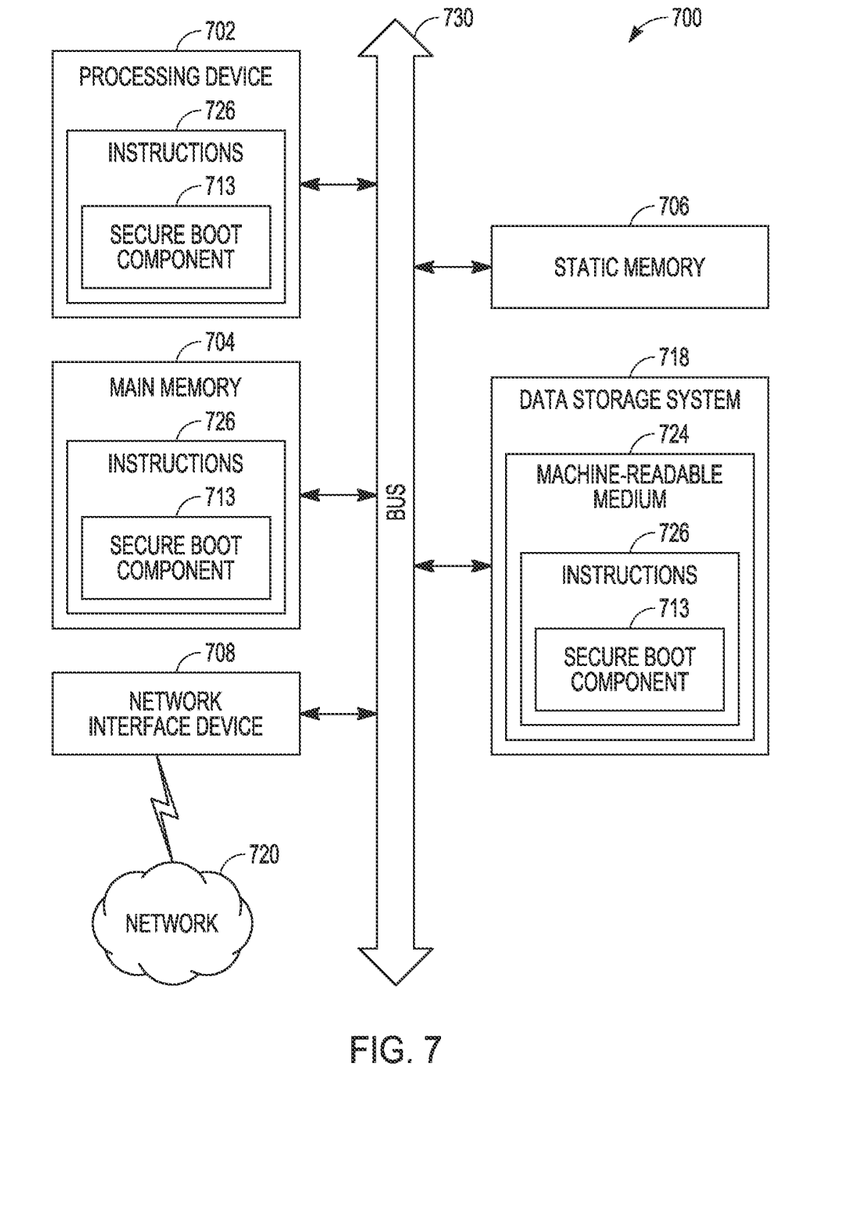
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the secure boot mode component 113 and the secure boot mode support component 114 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or registered DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device can be a complex instruction set computing (CSC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can include a secure boot component 713, which can include instructions similar to instructions in the secure boot mode component 113, the secure boot mode support component 114, or in the combination of the secure boot mode component 113 and the secure boot mode support component 114 of FIG. 1. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to the secure boot component 713 (e.g., the combination of the secure boot mode component 113 and the secure boot mode support component 114 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs. and magnetic-optical disks, read-only memories (ROMs), random access memories (RAMs), EPROMs. EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The following are example embodiments of methods, apparatus, and systems, in accordance with the teachings herein.

An example memory system 1 can comprise: a memory component; and a processing device, coupled to the memory component, configured to perform operations comprising: performing a cryptographic verification with a host to conduct an authentication of the host; interacting with the host, in response to the authentication, to receive a setting to control a boot process for the memory system in a secure boot mode; interacting with another processing device of the memory system to store the setting; and receiving a secure boot signal from the other processing device, the secure boot signal to assert or de-assert the secure boot mode based on a value of the setting.

An example memory system 2 can comprise features of example memory system 1 and can comprise the cryptographic verification to comprise a Rivest-Shamir-Adleman signature verification.

An example memory system 3 can comprise features of any of the preceding example memory systems and can comprise the processing device, in response to receiving the secure boot signal to de-assert the secure boot mode, to interact with the host to allow download of firmware to execute instructions as a secondary boot loader.

An example memory system 4 can comprise features of any of the preceding example memory systems and can comprise power to the processing device being controlled by the other processing device.

An example memory system 5 can comprise: a memory component; a memory controller, coupled to the memory component, configured to control a boot process for the memory system to operate the memory component; a microcontroller coupled to the memory controller; a non-volatile memory storing a secondary boot loader, the secondary boot loader operated following operation of a primary boot loader in the boot process; and memory controller firmware having stored instructions, executable by the memory controller, to cause the memory controller to perform operations comprising: performing a cryptographic verification with a host to conduct an authentication of the host; interacting with the host, in response to the authentication, to receive a setting to control the boot process in a secure boot mode; interacting with the microcontroller to store the setting in the microcontroller; and receiving a secure boot signal from the microcontroller, the secure boot signal to assert or de-assert the secure boot mode based on a value of the setting.

An example memory system 6 can comprise features of example memory system 5 and can comprise the setting for the secure boot mode being stored in a non-volatile memory in the microcontroller.

An example memory system 7 can comprise features of any preceding example memory systems 5 and 6 and can comprise the non-volatile memory being a ferroelectric random access memory.

An example memory system 8 can comprise features of any preceding example memory systems 5-7 and can comprise the microcontroller to comprise an output pin to send the secure boot signal to the memory controller and the memory controller comprises an input pin to receive the secure boot signal.

An example memory system 9 can comprise features of any preceding example memory systems 5-8 and can comprise the memory system to comprise a bus to which the microcontroller and the memory controller are coupled, and over which the microcontroller and the memory controller interact to disable or enable the secure boot mode by execution of instructions in a microcontroller firmware by the microcontroller and execution of instructions in the memory controller firmware by the memory controller.

An example memory system 10 can comprise features of any preceding example memory systems 5-9 and can comprise the memory system to comprise a microcontroller firmware, the microcontroller firmware having instructions, executable by the microcontroller, to interact with a host through the memory controller, in response to transitioning to a secure boot enabled state, to provision the microcontroller with an enabled secure boot mode setting via one or more specific commands.

An example memory system 11 can comprise features of any preceding example memory systems 5-10 and can comprise, with the secure boot mode being in a state at the transitioning, the one or more specific commands comprise a command to get the state of the secure boot mode and a command to set the state of the secure boot mode, the command to set the state of the secure boot mode being tied to a cryptographically secure authentication protocol.

An example memory system 12 can comprise features of any preceding example memory systems 5-11 and can comprise the cryptographically secure authentication protocol to comprise use of a digital signature.

An example memory system 13 can comprise features of any preceding example memory systems 5-12 and can comprise the microcontroller to control power to the memory component, the memory controller, and the non-volatile memory.

An example method 1 can comprise: performing, in a memory controller of a memory system, a cryptographic verification between the memory controller and a host to conduct an authentication of the host; storing a setting in a microcontroller of the memory system, in response to the authentication, the setting being a setting for a secure boot mode for the memory controller to control a boot process; and receiving, in the memory controller, a secure boot signal from the microcontroller, the secure boot signal to assert or de-assert the secure boot mode based on a value of the setting.

An example method 2 can comprise features of example method 1 and can comprise de-asserting the secure boot mode, in response to a successful cryptographic verification with a host, to allow download of firmware to execute instructions as a secondary boot loader.

An example method 3 can comprise features of any preceding example methods 1 and 2 and can comprise, in response to transitioning to a secure deployed state, provisioning the microcontroller with an enabled secure boot mode setting via one or more specific commands.

An example method 4 can comprise features of any preceding example methods 1-3 and can comprise, with the secure boot mode in a state at the transitioning, the one or more specific commands to comprise a command to get the state of the secure boot mode and a command to set the state of the secure boot mode, the command to set the state of the secure boot mode tied to a cryptographic authentication protocol.

An example method 5 can comprise features of any preceding example methods 1-4 and can comprise using a digital signature in the cryptographic authentication protocol.

An example method 6 can comprise features of any preceding example methods 1-5 and can comprise: directly loading a firmware image, via the host, into a random access memory coupled to the memory controller, in response to satisfaction of an authentication protocol performed between the memory controller and the host; and executing instructions of the firmware image with the memory controller in the secure boot mode.

An example method 7 can comprise features of any preceding example methods 1-6 and can comprise performing the cryptographic verification including using a Rivest-Shamir-Adleman signature verification.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
    a memory component; and
    a memory sub-system controller coupled to the memory component and configured to perform operations comprising:
        after successful authentication of a host system:
            receiving, from the host system, a command to set a state of a secure boot mode of the memory sub-system;
            in response to the command, interacting with a microcontroller to store a setting on the microcontroller, the microcontroller being configured to at least one of assert or de-assert a secure boot signal to the memory sub-system controller based on a value of the stored setting;
            in response to the secure boot signal being asserted by the microcontroller, causing the memory sub-system to transition to the secure boot mode; and in response to the secure boot signal being de-asserted by the microcontroller, interacting with the host system to allow the memory sub-system controller to download firmware from the host system, the firmware being configured to execute instructions as a secondary boot loader on the memory sub-system controller.

2. The memory sub-system of claim 1, wherein the microcontroller controls power to the memory sub-system controller.

3. The memory sub-system of claim 1, wherein the stored setting is stored in a non-volatile memory of the microcontroller.

4. The memory sub-system of claim 1, wherein the microcontroller comprises an output pin to send the secure boot signal to the memory sub-system controller and the memory sub-system controller comprises an input pin to receive the secure boot signal.

5. The memory sub-system of claim 1, wherein the successful authentication comprises performing cryptographic verification of the host system, the cryptographic verification comprising a Rivest-Shamir-Adleman signature verification.

6. The memory sub-system of claim 1, wherein the successful authentication comprises performing cryptographic verification of the host system, the cryptographic verification comprising a cryptographically secure authentication protocol that uses of a digital signature.

7. The memory sub-system of claim 1, wherein interacting with the host system to allow the memory sub-system controller to download the firmware from the host system comprises:
loading a firmware image, by the memory sub-system controller via the host system, into a random access memory coupled to the memory sub-system controller; and
executing instructions of the firmware image by the memory sub-system controller.

8. The memory sub-system of claim 1, wherein the microcontroller controls power to the memory sub-system controller.

9. A memory sub-system comprising;
a memory component;
a memory sub-system controller coupled to the memory component;
a microcontroller coupled to the memory sub-system controller, the memory sub-system controller being configured to perform operations comprising:
after successful authentication of a host system:
receiving, from the host system, a command to set a state of a secure boot mode of the memory sub-system;
in response to the command, interacting with the microcontroller to store a setting on the microcontroller, the microcontroller being configured to assert or de-assert a secure boot signal to the memory sub-system controller, the secure boot signal being asserted or de-asserted based on a value of the stored setting;
in response to the secure boot signal being asserted by the microcontroller, causing the memory sub-system to transition to the secure boot mode; and
in response to the secure boot signal being de-asserted by the microcontroller, interacting with the host system to allow the memory sub-system controller to download firmware from the host system, the firm-ware being configured to execute instructions as a secondary boot loader on the memory sub-system controller.

10. The memory sub-system of claim 9, wherein the stored setting for the secure boot mode is stored in non-volatile memory of the microcontroller.

11. The memory sub-system of claim 10, wherein the non-volatile memory is a ferroelectric random access memory.

12. The memory sub-system of claim 9, wherein the microcontroller comprises an output pin to send the secure boot signal to the memory sub-system controller and the memory sub-system controller comprises an input pin to receive the secure boot signal.

13. The memory sub-system of claim 9, further comprising a bus coupling the microcontroller and the memory sub-system controller, the bus enabling interactions between the microcontroller and the memory sub-system controller.

14. The memory sub-system of claim 9, wherein the microcontroller controls power to the memory sub-system controller.

15. A method comprising:
after successful authentication of a host system by a memory sub-system controller of a memory sub-system:
receiving, at the memory sub-system controller from the host system, a command to set a state of a secure boot mode of the memory sub-system;
in response to the command, interacting with a microcontroller to store a setting on the microcontroller, the microcontroller being configured to cause the microcontroller to assert or de-assert a secure boot signal to the memory sub-system controller, the secure boot signal being asserted or de-asserted based on a value of the stored setting; and
in response to the secure boot signal being de-asserted by the microcontroller, interacting, by the memory sub-system controller, with the host system to allow the memory sub-system controller to download firmware from the host system, the firmware being configured to execute instructions as a secondary boot loader on the memory sub-system controller.

16. The method of claim 15, further comprising:
in response to the secure boot signal being asserted by the microcontroller, causing, by the memory sub-system controller, the memory sub-system to transition to the secure boot mode.

17. The method of claim 15, wherein interacting with the host system to allow the memory sub-system controller to download the firmware from the host system comprises:
loading a firmware image, by the memory sub-system controller via the host system, into a random access memory coupled to the memory sub-system controller; and
executing instructions of the firmware image by the memory sub-system controller.

18. The method of claim 15, wherein the successful authentication comprises performing cryptographic verification of the host system, the cryptographic verification comprising a Rivest-Shamir-Adleman signature verification.

19. The method of claim 15, wherein the successful authentication comprises performing cryptographic verification of the host system, the cryptographic verification comprising a cryptographically secure authentication protocol that uses of a digital signature.

20. The method of claim 15, wherein the microcontroller controls power to the memory sub-system controller.

\* \* \* \* \*